United States Patent
Nemat-Nasser et al.

(10) Patent No.: US 9,158,962 B1
(45) Date of Patent: Oct. 13, 2015

(54) PASSIVE DRIVER IDENTIFICATION

(71) Applicant: Lytx, Inc., San Diego, CA (US)

(72) Inventors: Syrus C. Nemat-Nasser, San Diego, CA (US); Andrew Tombras Smith, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/272,401

(22) Filed: May 7, 2014

(51) Int. Cl.
*G06K 9/00* (2006.01)

(52) U.S. Cl.
CPC .................... *G06K 9/00221* (2013.01)

(58) Field of Classification Search
CPC .......... G06K 9/00228; G06K 9/00221; G06K 9/00288; G06K 9/00281
USPC .................................................. 382/118, 115
See application file for complete search history.

(56) References Cited

U.S. PATENT DOCUMENTS

| | | | |
|---|---|---|---|
| 6,249,720 B1 | 6/2001 | Kubota et al. | |
| 2008/0252412 A1* | 10/2008 | Larsson et al. | 340/5.2 |
| 2012/0253548 A1 | 10/2012 | Davidson | |
| 2013/0073114 A1 | 3/2013 | Nemat-Nasser et al. | |
| 2014/0129053 A1* | 5/2014 | Kleve et al. | 701/2 |
| 2014/0207309 A1* | 7/2014 | Armitage et al. | 701/1 |
| 2014/0210625 A1* | 7/2014 | Nemat-Nasser | 340/575 |

\* cited by examiner

*Primary Examiner* — Ruiping Li
(74) *Attorney, Agent, or Firm* — Van Pelt, Yi & James LLP

(57) ABSTRACT

A system for passive driver identification comprises an input interface and a processor. The input interface is configured to receive a collection of face data from a vehicle event recorder. The processor is configured to 1) determine a set of face data of the collection of face data that is associated with a trip; 2) determine a first album associated with the trip, wherein the set of face data associated with the trip is similar to face data of other trips in the first album, and wherein the set of face data associated with the trip is dissimilar to face data of a set of trips in a second album; and 3) assign an identifier that associates the trip to the first album.

16 Claims, 20 Drawing Sheets

PASSIVE DRIVER IDENTIFICATION

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, then sensor data related to the event is stored for later review. An individual vehicle operator (e.g., a driver) can be associated with events that occurred while he operated the vehicle in order to establish a driver score. Driver scores can be used to rank drivers, identify unsafe drivers, identify drivers in need of coaching, etc.

BRIEF DESCRIPTION OF THE DRAWINGS

Various embodiments of the invention are disclosed in the following detailed description and the accompanying drawings.

DETAILED DESCRIPTION

Figure 1:
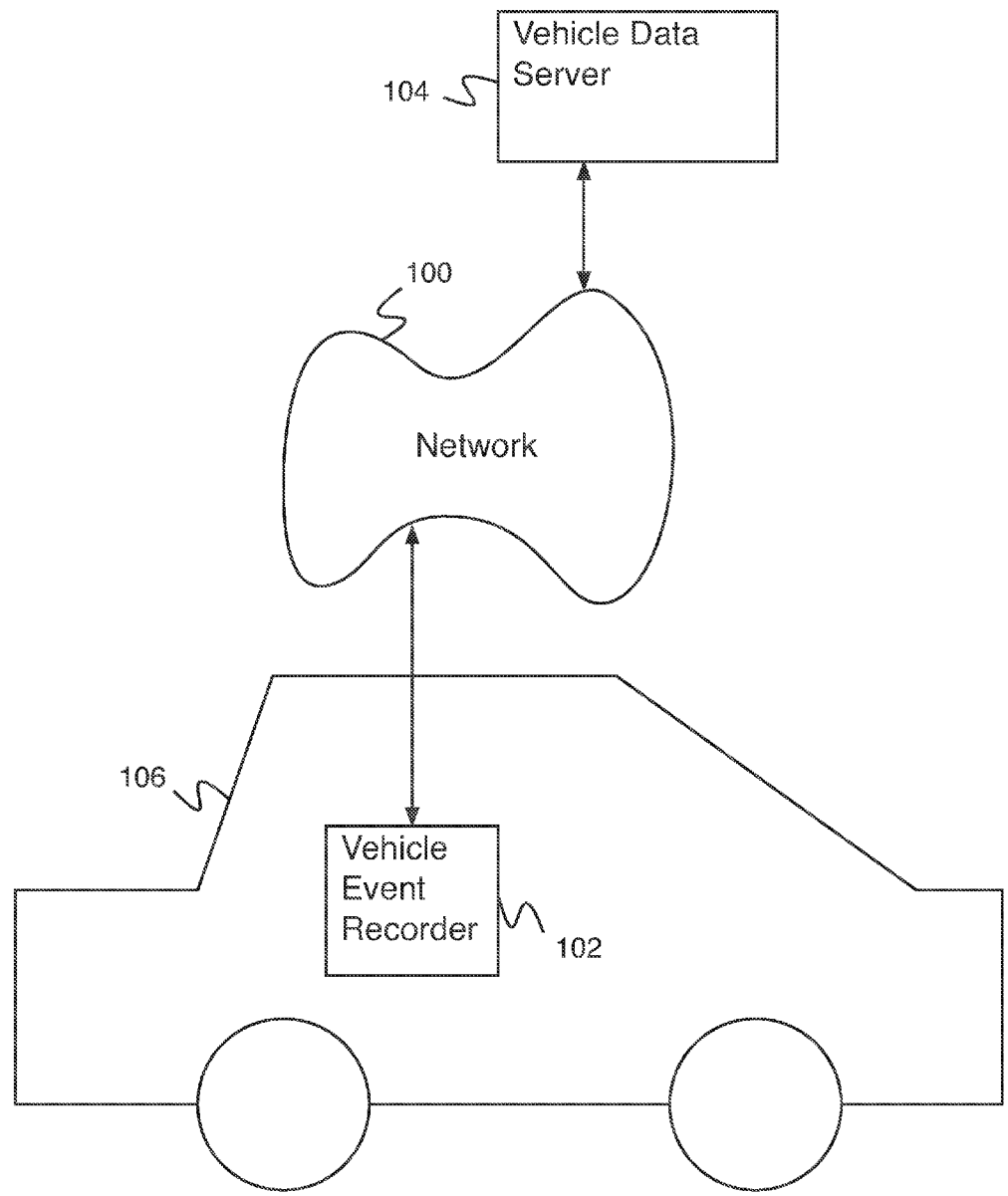
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Passive driver identification is disclosed. A system for passive driver identification comprises an input interface configured to receive a collection of face data from a vehicle event recorder. The system for passive driver identification additionally comprises a processor configured to determine a set of face data of the collection of face data that is associated with a trip; determine a first album associated with the trip; wherein the set of face data associated with the trip is similar to face data of other trips in the first album, and wherein the set of face data associated with the trip is dissimilar to face data of a set of trips in a second album; and assign an identifier that associates the trip to the first album. The system for passive driver identification additionally comprises a memory coupled to the processor and configured to provide the processor with instructions.

In some embodiments, the set of face data of the collection of face data comprises a subset of the collection of face data.

In some embodiments, a vehicle event recorder mounted on a vehicle records anomalous vehicle events. Anomalous vehicle event types include accidents, speed limit violations, rough road events, hard maneuvering events (e.g., hard cornering, hard braking), dangerous driving events (e.g., cell phone usage, eating while driving, working too long of a shift, sleepy driving, etc.), and any other appropriate type of anomalous vehicle event. When anomalous vehicle events occur, sensors (video recorders, audio recorders, accelerometers, gyroscopes, vehicle state sensors, GPS, etc.) record anomalous vehicle event data associated with the event. The event is stored on the vehicle event recorder associated with the event data. Anomalous events can then be correlated with the driver using an associated driver identifier (e.g., from a driver schedule). Drivers found to have poor performance (e.g., more frequent or severe anomalous vehicle events) can then be coached appropriately. In some situations, a driver identifier is not entered and cannot be determined from a driver schedule. The driver can still be tracked, however, using passive driver identification.

In some embodiments, during normal vehicle operation, the vehicle event recorder captures images of the driver using an inwardly facing camera. Images are captured at vehicle start and at regular intervals (e.g., every 10 minutes, every 5 miles driven, etc.) thereafter. In some embodiments, the time between image captures is dynamically determined—for example, based on a face detection algorithm that estimates the quality and/or quantity of recently captured images. In some embodiments, in the event that quality or quantity of faces detected is not above a 'not enough' threshold, the rate of image capture is increased and in the event that the quality or quantity of faces detected is above a 'too much' threshold, the rate of image capture is decreased. After a trip is completed (e.g., the vehicle is stopped), the images are gathered together and labeled as a single trip. In some embodiments, other sensor data is associated with images from the inwardly facing camera as part of the trip (e.g., global positioning system (GPS) data, ignition system data, etc.). Face data are then extracted from each image in the trip. Face data comprise a set of numeric quantities calculated from a face image that is used to compare face images (e.g., a parameterization of face dimensions). Based on the extracted face data, the trip is broken into shorter trips, where each of the shorter trips comprises a portion of the full trip with a single driver. In some embodiments, trips are broken into shorter trips by comparing the images within the trip to one another. In some embodiments, additional constraints are applied—for example, if the vehicle is moving continuously during the trip, a single driver can be inferred, whereas if the vehicle stops for several minutes during a trip, the driver may have changed. The "trip assembly" procedure comprises delineating the trips so that only one driver is believed to have operated the vehicle during each trip, and establishing the "quality" of each trip. Each trip is determined to be of high quality or of low quality, wherein a high quality trip comprises greater than a threshold number of driver images taken over greater than a threshold duration of time (e.g., at least 3 driver images, with a total trip time of at least 3 minutes). In some embodiments, the system excludes driver images that are determined to be less useful for face recognition when determining whether or not the minimum threshold of images is reached. A high quality trip satisfying a larger threshold number of driver images (e.g., at least 10 driver images) is considered a high quality long trip. Each trip is compared with a set of established albums, each album comprising trips with a single driver (e.g. the same driver is associated with all of the trips in the album). If a high quality long trip is found to match a threshold fraction of trips in a selected album, and to not match more than a threshold fraction of trips in any other album, the trip is added to the album. In some embodiments, two trips match if there is a greater than a minimum probability of their having the same driver. In some embodiments, a trip is not added to the album if the addition of the trip causes one or both of these consistency constraints to be violated for any existing trip in another album. Anomalous events associated with any trip in an album are known to be associated with the same driver. Periodically, external identifier signals correlating known drivers with trips are received (e.g., driver coaching event signals, dispatch log signals, etc.). If an external identifier signal is associated with a trip associated with an album, the driver associated with the external identifier signal can be associated with the album. Any anomalous events associated with trips in the album are thus associated with the driver. In some embodiments, more than one external identifier signal may be required to confirm the association of a driver with an album. In various embodiments, a conflicting signal invalidates the association of a driver with an album, indicates problems with the album, indicates problems with the external identifier signals themselves, or any other appropriate indication that potentially comes from a conflicting signal. In some embodiments, face data are extracted as images are captured so some or most images can be immediately discarded to reduce storage requirements. In some embodiments, a trip comprises all the face data from the images captured whether or not the images themselves are stored.

In some embodiments, each vehicle's event recorder (ER) periodically attempts to detect a face, and if a face is detected, "face data" are extracted. In some embodiments, an image used for a face detection is stored and uploaded for quality assurance (QA) or other purposes. The face data for a particular image are opaque (e.g., an image of the face cannot be reconstructed from the face data), and are only used to establish identity (e.g., by comparing the face data from a first image to the face data from a second image).

In some embodiments, passive driver identification is a service to keep track of which people have driven which vehicles. The term "passive" is meant to indicate that the system requires no extra actions of the drivers or coaches, such as logging into a record system each time they use the vehicle, or keeping log books. In some embodiments, passive driver identification is performed using automatic face detection and facial recognition. In some embodiments, a passive driver identification system includes other identity-establishing data (e.g., driving or maneuvering styles). In some embodiments, the entire system is based on identity-establishing data that does not include face data. In some embodiments, face data are uploaded to servers and combined with ignition (and possibly other) signals to assemble "trips", each of which represents a contiguous interval in time inside a particular vehicle during which faces were seen and face data were recorded. These intervals are defined to consist only of a single driver; if the driver switches in the middle of a trip (e.g., initially defined by ignition state), that trip is split into two trips by comparing face data.

In some embodiments, the passive driver identification task is constrained by limiting the task to consider a limited "group" of drivers and vehicles. By limiting the number of vehicles and drivers, the difficulty of correctly identifying each driver in each trip is reduced. For example, a group is defined as the drivers and vehicles in an entire company or a geographically organized division or sub-division of a company. In some embodiments, identification of the driver for a particular trip is accomplished on the servers by comparing the "faces" in that trip to the faces in "albums." A "face" in this driver identification system refers to the face data extracted from a single image in which a face is detected. In some embodiments, these face data are used to estimate the probability that the person in the image is the same as the person in another image (e.g., a first person in a first image is the same as a second person in a second image). An album for a particular driver comprises a set of "high-quality trips," trips that each contain a minimum number of faces matching each other to a high degree. In some embodiments, the set of albums for a group must at all times satisfy two consistency requirements: 1) all the trips in a single album must match each other to high degree; 2) the trips in an album must not match trips in other albums above some maximum (low) degree.

In some embodiments, face-comparisons are computed on servers, not on ERs. In some embodiments, album building and maintenance and trip identification are separate processes.

In some embodiments, album maintenance begins once new trips are assembled. First, the high quality trips are compared to the group's existing albums to determine if any of them can be added to an existing album without violating the consistency constraints. As albums grow beyond the maximum allowed size, older trips are removed from the albums and replaced by newer trips. After this process, passive driver identification attempts to discover new albums (e.g., albums for drivers who currently don't already have one) by combining the new high quality trips with unused old high quality trips (e.g., old high quality trips not in any album), and "clustering" that combined set. In some embodiments, clustering refers to an algorithmic process to partition a set of elements into clusters, each of which is a subset whose elements are similar to each other according to some similarity metric, and any two elements in different clusters are less similar to each other. Any clusters found are candidate new albums, and passive driver identification compares those candidates to the existing albums to determine which of them, if any, can be added to the existing set of albums without violating the consistency requirements.

In some embodiments, "trip identification" refers to any process that identifies the driver operating a vehicle during a trip within a given group (e.g., employees of a company, a driver in a division, a driver on a particular shift, etc.). In some embodiments, the trip identification procedure is run independently from the album building and maintenance procedure. After trip assembly, each trip is initially unidentified. Each unidentified trip in the group is compared to the set of albums for that group, and if the probability that the trip contains the same driver as an album is above a minimum threshold, that trip is associated with that album, and the probability is recorded. In some embodiments, a trip may match more than one album above a minimum threshold, in which case the trip is associated with the matching albums with an association strength calculated to approximate the relative probability of matching each of the albums.

In some embodiments, albums are associated with drivers by "external ID signals," signals that indicate that a specific person was in a specific vehicle at a specific time. In various embodiments, the external ID signals include video events for which a supervisor has provided and/or confirmed the driver's identity, driver dispatch logs that provide a schedule for drivers in vehicles, or any other appropriate external ID signals. When trips are associated to albums that are not yet associated to external ID signals, those trips are given a placeholder ID until that album becomes associated with a driver.

In some embodiments, a passive driver identification process is used in a query-response fashion by providing as input a vehicle identifier and a date-time (e.g., a specific date and time of day). The process searches the set of trips that exist for that vehicle, finds the trip that spans the date-time, and outputs the identity of the driver and confidence in the assignment (e.g., probability of correctness).

In some embodiments, a first trip is compared to a second trip by comparing some or all of the face data in the first trip to some or all of the face data in the second trip, resulting in a set of probabilities, and deriving inputs to a binary classifier from these probabilities. In some embodiments, albums comprise a set of trips all determined with high probability to be the same driver. In some embodiments, one or more new trips are added to an album (e.g., at a scheduled time, in response to a size limit being passed, etc.) and one or more old trips are removed from albums (e.g., at a scheduled time, in response to a size limit being passed, etc.) to keep the album up-to-date and at an optimal size. In some embodiments, a new album is created by applying a clustering algorithm to a set of trips containing faces not represented in the set of existing albums. In some embodiments, any potential changes to an album or the set of albums must satisfy a set of consistency requirements in order to proceed. In some embodiments, the consistency requirements comprise 1) all the trips in a single album must match each other to high degree; 2) the trips in an album must not match trips in other albums above some maximum (low) degree.

FIG. 1 is a block diagram illustrating an embodiment of a system including a vehicle event recorder. In the example shown, vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, global positioning system (GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, an ignition sensor, or any other appropriate vehicle state sensors. In some embodiments, vehicle event recorder 102 comprises a system for processing sensor data and detecting events. In some embodiments, vehicle event recorder 102 comprises a system for detecting risky behavior. In some embodiments, vehicle event recorder 102 comprises a system for capturing a driver image. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a code division multiple access (CDMA) network, a global system for mobile communication (GSM) network, a local area network, a wide area network, the Internet, or any other appropriate network. In some embodiments, network 100 comprises multiple networks, changing over time and location. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for passive driver identification. In some embodiments, vehicle data server comprises a vehicle data server for one or more groups. In some embodiments, a group comprises a set of vehicles and associated drivers—for example, a company (e.g., a trucking company, a limousine company, etc.) or geographically defined subdivision of a company.

Figure 2:
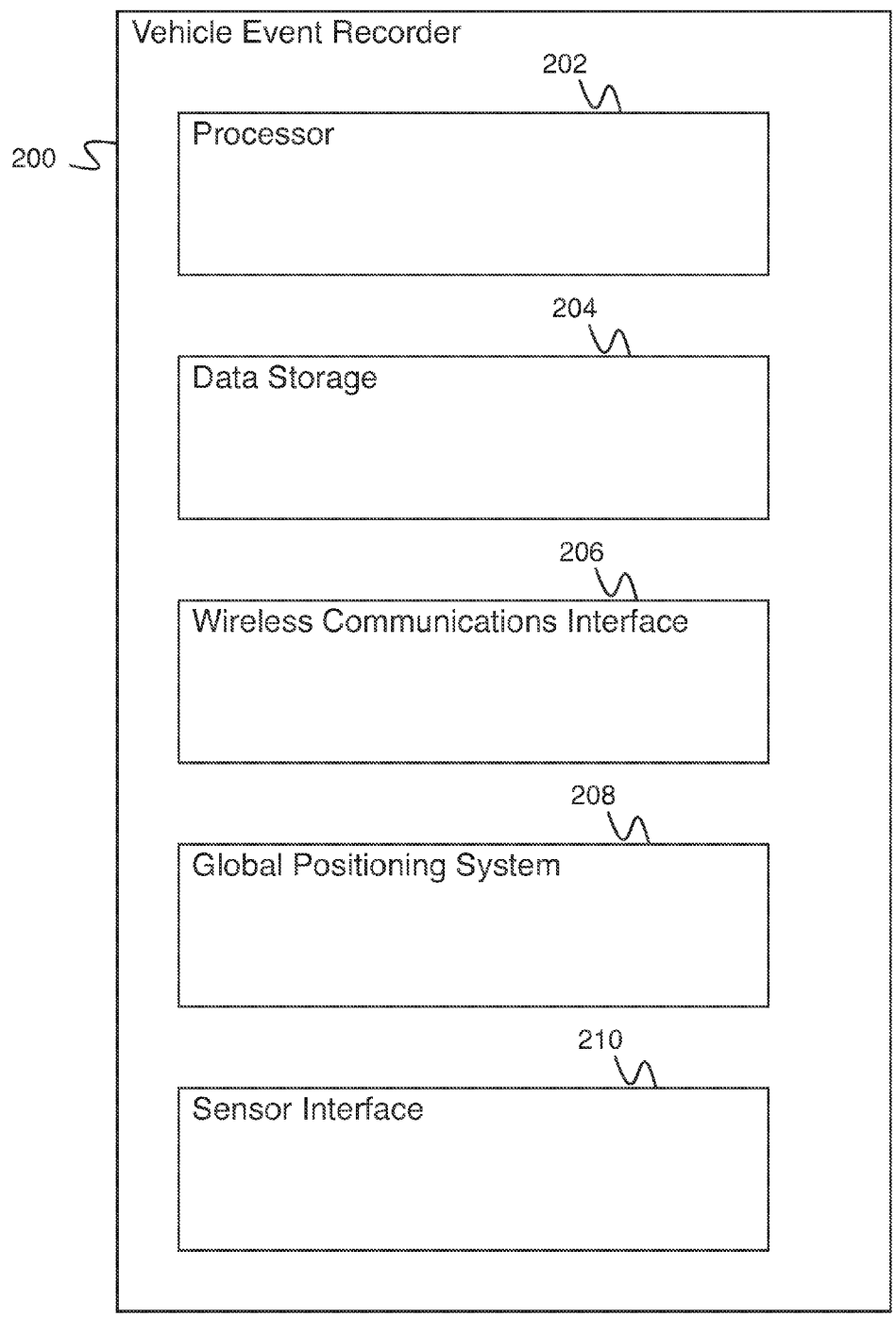
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, for determining a position using global positioning system 208, and for reading data via sensor interface 210. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, map data, or any other appropriate data. In various embodiments, wireless communications interface 206 comprises one or more of a GSM interface, a CDMA interface, a WiFi interface, or any other appropriate interface. Global positioning system 208 comprises a global positioning system (e.g., GPS) for determining a system location. Sensor interface 210 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 210 comprises an on-board diagnostics (OBD) bus. In some embodiments, vehicle event recorder 200 communicates with vehicle state sensors via OBD bus.

Figure 3:
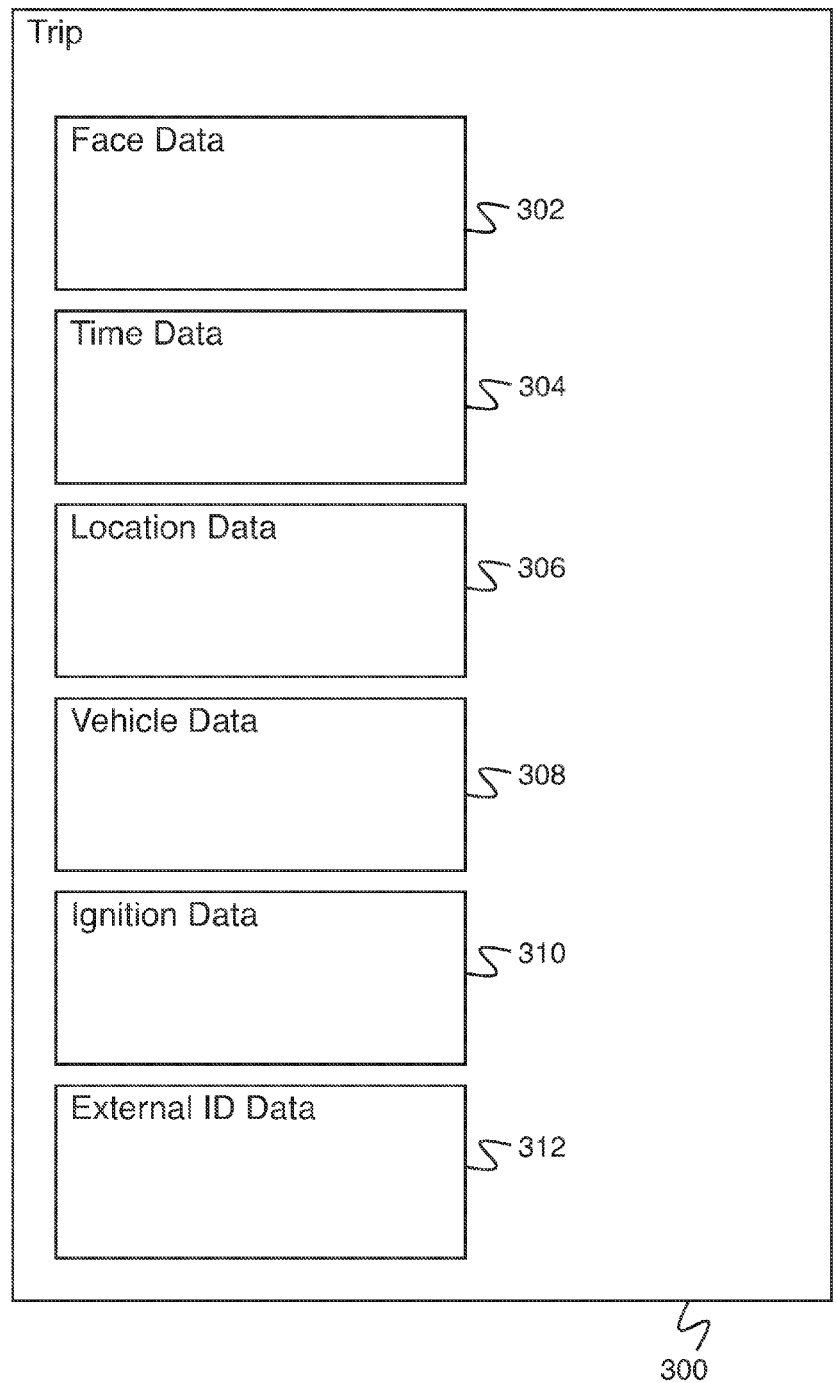
FIG. 3 is a diagram illustrating an embodiment of trip data.

FIG. 3 is a diagram illustrating an embodiment of trip data. In some embodiments, trip 300 comprises trip data. In various embodiments, trip 300 comprises trip data stored on a vehicle event recorder (e.g., vehicle event recorder 102 of FIG. 1), trip data stored on a vehicle data server (e.g., vehicle data server 104 of FIG. 1), or trip data stored in any other appropriate location. In the example shown, trip 300 comprises face data 302. In some embodiments, face data 302 comprises face images captured by a vehicle data recorder. In some embodiments, face data 302 comprises parameterized face data extracted from face images. In some embodiments, face data 302 comprises face quality data (e.g., data indicating the estimated usefulness of the face images and/or parameterized face data for the task of identifying drivers). Time data 304 comprises trip time data (e.g., trip start time data, trip stop time data, etc.). Location data 306 comprises trip location data (e.g., GPS data, etc.). Vehicle data 308 comprises trip vehicle data (e.g., vehicle information indicating the vehicle used on the trip). Ignition data 310 comprises ignition data associated with the trip (e.g., ignition start data, ignition stop data, time or location data associated with ignition start data or ignition stop data, or any other appropriate ignition data). External ID data 312 comprises data associating trip 300 with an external identifier (e.g., a driver coaching event, an entry from a dispatch log, etc.). In some embodiments, trips are each associated with zero, one, or more than one external identifier. In some embodiments, external ID data 312 comprises data associating trip 300 with a driver. In some embodiments, an external ID data 312 includes a confidence value (e.g., the confidence that the driver associated with the external identifier is correct). When more than one external identifier is associated with trip 300, the confidence level of each identifier is included in external ID data 312.

Figure 4:
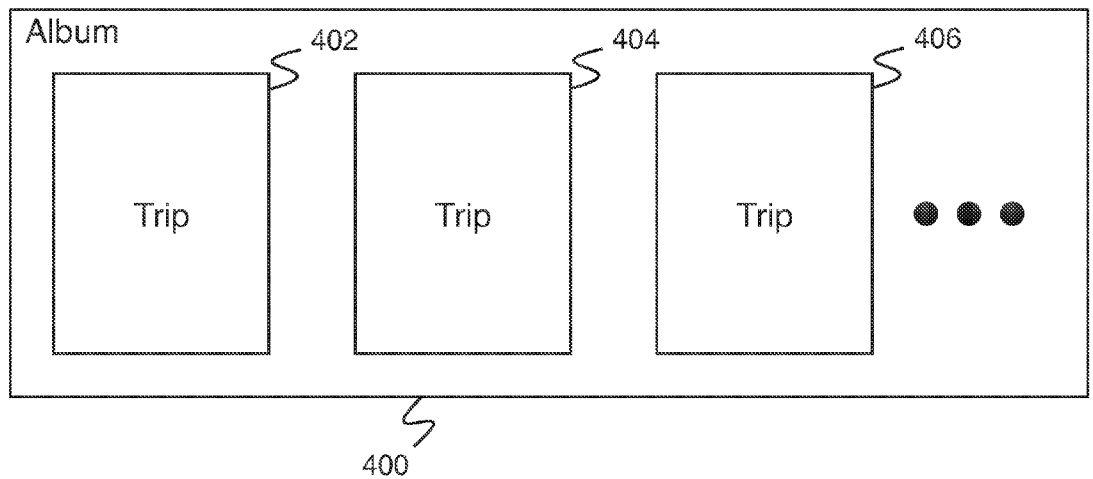
FIG. 4 is a diagram illustrating an embodiment of an album.

FIG. 4 is a diagram illustrating an embodiment of an album. In the example shown, album 400 comprises trip 402, trip 404, and trip 406. In some embodiments, album 400 comprises a number of trips between a minimum number and maximum number of trips, where the minimum and maximum are chosen to optimize system performance or satisfy other technical constraints. In some embodiments, albums are stored on a vehicle data server. In some embodiments, an album represents a collection of trips all associated with the same driver. In some embodiments, each trip associated with an album comprises face data associated with the same driver.

Figure 5:
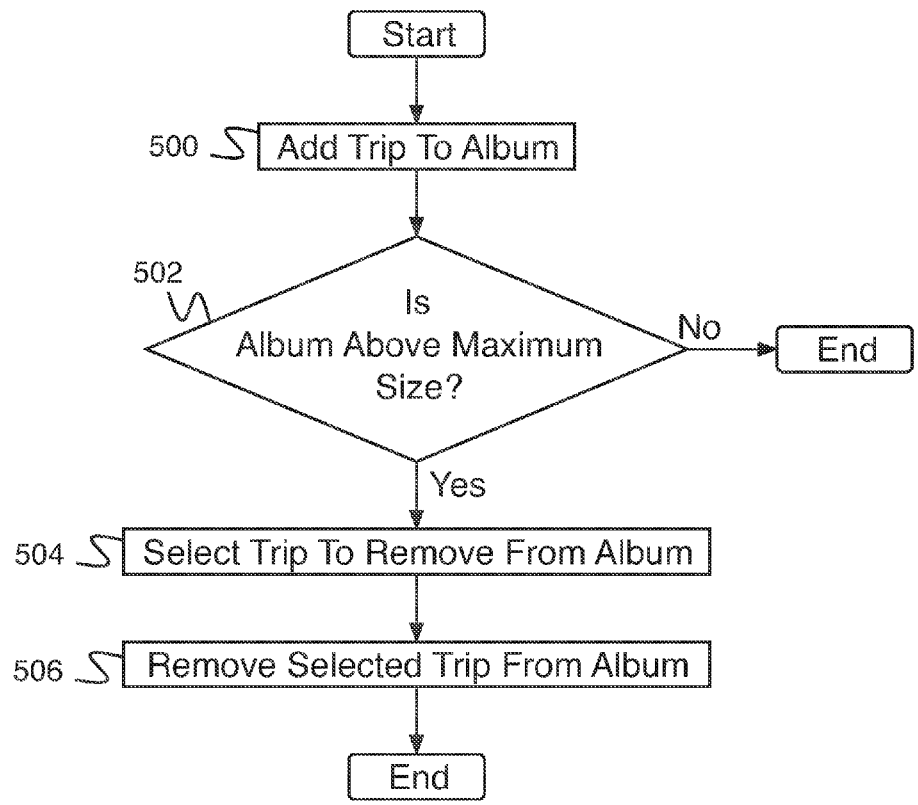
FIG. 5 is a flow diagram illustrating an embodiment of a process for maintaining an album's size.

FIG. 5 is a flow diagram illustrating an embodiment of a process for maintaining an album's size. In some embodiments, the process of FIG. 5 is used by a vehicle data server (e.g., vehicle data server 104 of FIG. 1) for maintaining an album's size. In some embodiments, the process of FIG. 5 is used in response to receiving an indication to add a trip (e.g., a trip as in trip 300 of FIG. 3) to an album (e.g., album 400 of FIG. 4). In the example shown, in 500, a trip is added to the album. In 502, it is determined whether the album is above the maximum size. In various embodiments, the maximum album size is programmed into vehicle data server software, is specified by the user, is determined automatically, depends on a system configuration, varies from one album to another album, or is specified or determined in any other appropriate way. In the example shown, if it is determined in 502 that the album is not above the maximum size, the process ends. If it is determined in 502 that the album is above the maximum size, control passes to 504. In 504, a trip is selected to remove from the album. In various embodiments, the trip selected to remove from the album comprises the oldest trip, the trip most different from the other trips in the album, the trip most similar to other trips in the album, the trip most similar to trips in other albums, a random trip, or any other appropriate trip. In 506, the selected trip is removed from the album.

Figure 6:
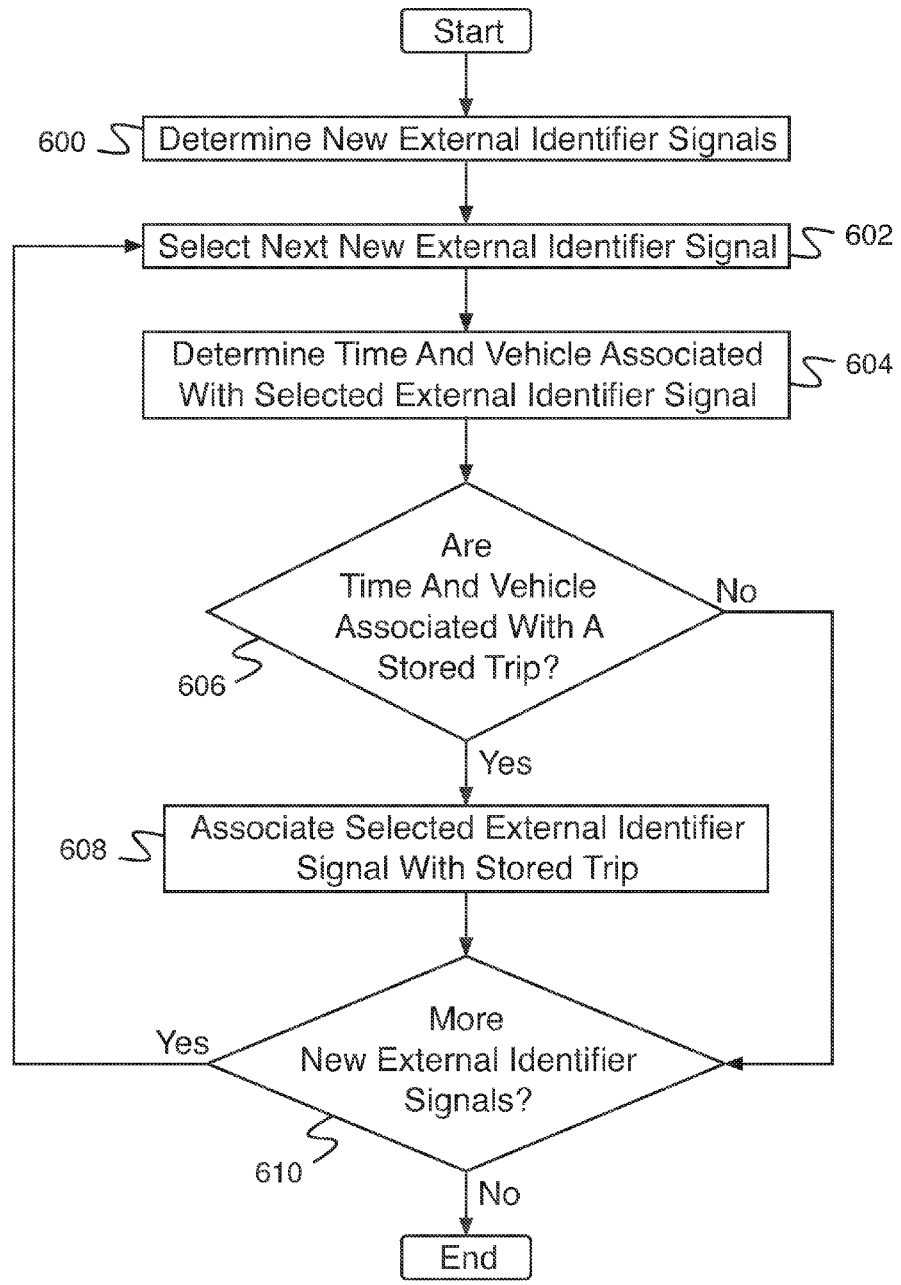
FIG. 6 is a flow diagram illustrating an embodiment of a process for associating external identifier signals.

FIG. 6 is a flow diagram illustrating an embodiment of a process for associating external identifier signals. In some embodiments, the process of FIG. 6 is used to associate external identifier signals (e.g., external ID data 312 of FIG. 3) with trips. In some embodiments, the process of FIG. 6 is executed periodically to associate any new external identifier signals (e.g., since the last time the process was executed) with trips. In the example shown, in 600, new external identifier signals are determined. In various embodiments, new external identifier signals are determined by checking a driver coaching event database, a dispatch log database, an external identifier signal database, or any other appropriate system database or log. In 602, the next new external identifier signal is selected. In some embodiments, the next new external identifier signal comprises the first new external identifier signal. In 604, a time and vehicle associated with the external identifier signal are determined. In various embodiments, the time and vehicle associated with the external identifier signal are determined from the external identifier signal, by querying a database, by prompting a system administrator, or in any other appropriate way. In 606, it is determined whether the time and vehicle are associated with a stored trip. Each vehicle only records data associated with a single trip at any given time, therefore the time and vehicle can only be associated with a single stored trip. If the time and vehicle are not determined to be associated with a stored trip, control passes to 610. If the time and vehicle are determined to be associated with a stored trip in 606, control passes to 608. In 608, the selected external identifier signal is associated with stored trip (e.g., the selected external identifier signal is stored as part of the trip data). In 610, it is determined whether there are more new external identifier signals. If it is determined that there are more new external identifier signals, control passes to 602. If it is determined in 610 that there are not more new external identifier signals in 610, the process ends.

In some embodiments, ID signals include coached events (e.g., video events for which a driving coach has confirmed the identity of the driver) dispatch signals (e.g., entries in a log book listing who was in which vehicle at which time), and/or other electronic or visually ascertained ID signals. In some embodiments, a special online program for coaches is added to provide identities to supplied images and/or videos, for the purpose of giving passive driver identification a more direct signal of which drivers were in which vehicles.

In some embodiments, trips are assigned to albums by the trip identification process, and albums are associated with Driver IDs by collecting external ID signals, and determining which of them occurred during a trip that is associated with an album. When this is the case, the ID signal and the trip are associated with the album. ID signals can have one of three "ID-album association types":

1) The ID signal occurred during a trip that is part of an album.
2) The ID signal occurred during a trip that had been part of an album but was removed.
3) The ID signal occurred during a trip that was assigned to an album but was never added to the album.

Multiple ID signals for the same album are useful because, if they agree, they increase the confidence that the association between that album and that driver is correct, and if they disagree, they can indicate potential problems with either the ID signal source (e.g., an incorrect dispatch log), or the album itself (e.g., an erroneous album which contains more than one driver).

Figure 7:
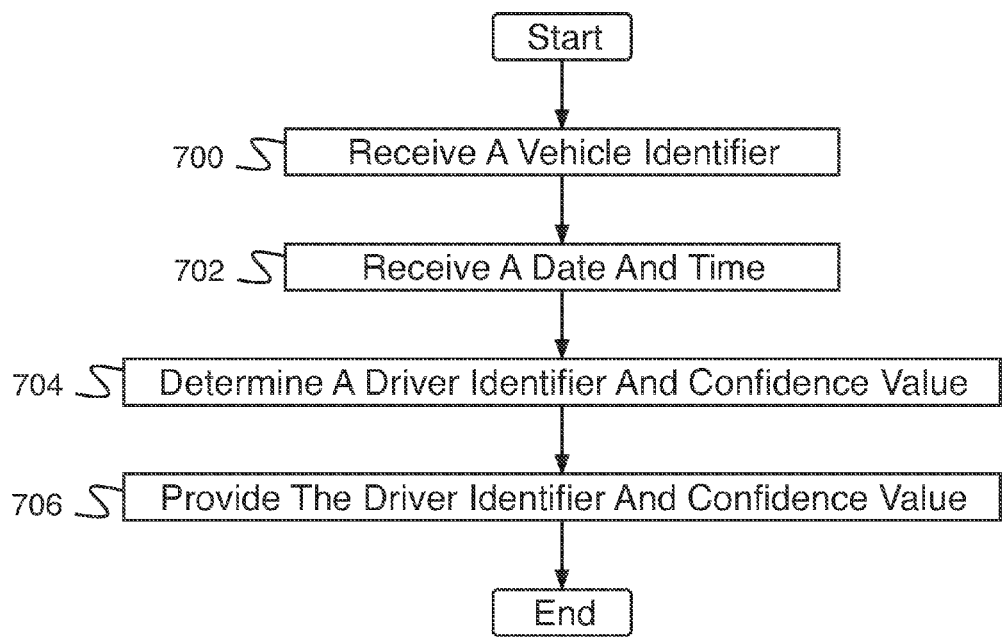
FIG. 7 is a flow diagram illustrating an embodiment of a query process.

FIG. 7 is a flow diagram illustrating an embodiment of a query process. In some embodiments, the process of FIG. 7 is executed by a vehicle data server (e.g., vehicle data server 104 of FIG. 1). In the example shown, in 700, a vehicle identifier is received. In 702, a date and time are received. In some embodiments, a vehicle identifier and a date and time uniquely identify a trip. In 704, a driver identifier and a confidence value are determined. In some embodiments, the confidence value comprises a confidence value that the driver associated with the driver identifier is the actual driver associated with the vehicle identifier and date and time. In 706, the driver identifier and confidence value are provided.

Figure 8:
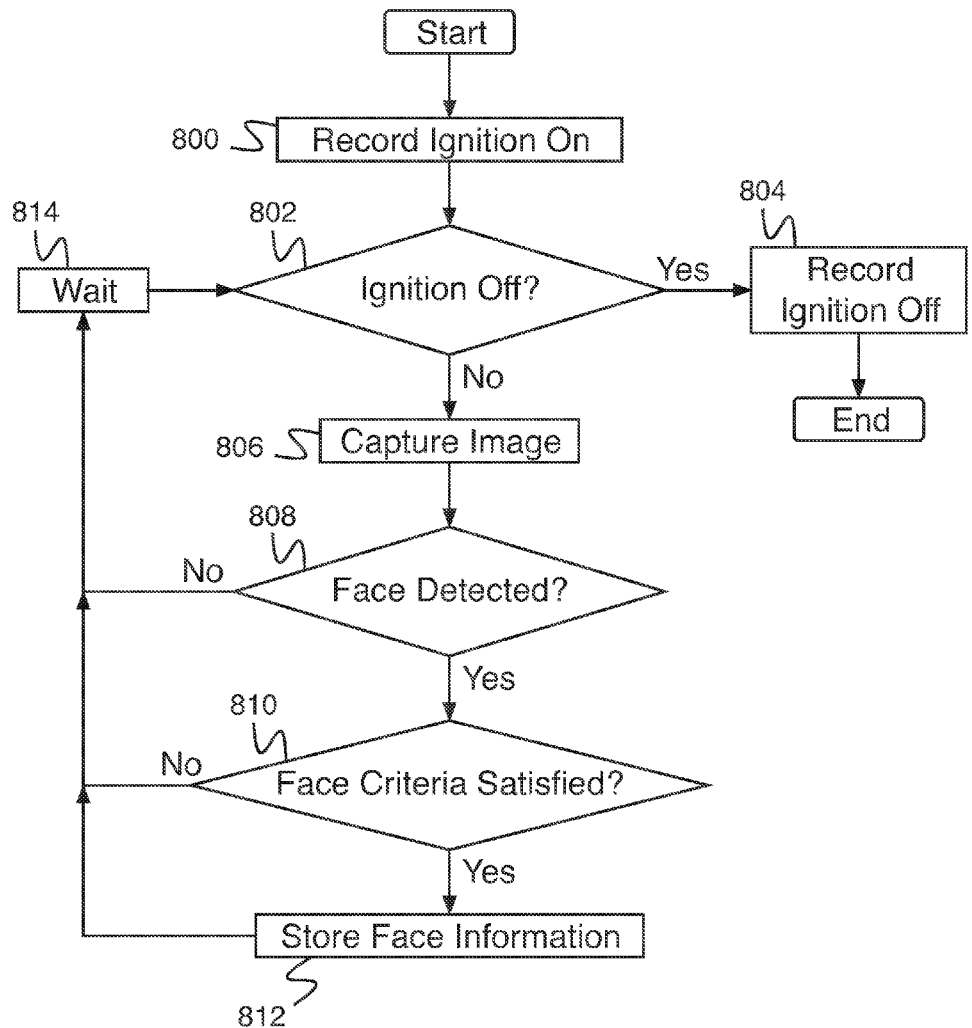
FIG. 8 is a flow diagram illustrating an embodiment of a process for recording faces.

FIG. 8 is a flow diagram illustrating an embodiment of a process for recording faces. In some embodiments, the process of FIG. 8 is executed by a vehicle event recorder (e.g., vehicle event recorder 102 of FIG. 1). In some embodiments, data stored as part of the process of FIG. 8 comprises one or more trips. In the example shown, in 800, the process records the ignition on. In some embodiments, the process of FIG. 8 is started in response to a determination that the ignition has been turned on. In 802, it is determined whether the ignition has been turned off. If it is determined in 802 that the ignition has been turned off, control passes to 804. In 804, it is recorded that the ignition is off, and the process ends. If it is determined in 802 that the ignition is not off, control passes to 806. In 806, an image is captured (e.g., by an inward-facing camera of the vehicle event recorder). In 808, it is determined whether a face is detected (e.g., in the image captured in 806). If a face is not detected, control passes to 814. If a face is detected, control passes to 810. In 810, it is determined whether face criteria are satisfied. In various embodiments, face criteria comprise face quality, the ability to extract face data (e.g., parameters of face geometry), the size of the face, the confidence that a face has been detected, or any other appropriate face criteria. If the face criteria are not satisfied, control passes to 814. If the face criteria are satisfied, control passes to 812. In 812, face information is saved. In various embodiments, face information comprises a face image, extracted face data, a face confidence value, a face quality, or any other appropriate face information. In some embodiments a face quality comprises low quality or high quality. In some embodiments, whether a face quality comprises low quality or high quality depends on a face size and a face confidence. Control then passes to 814. In 814, the process waits. In some embodiments, the process calculates an appropriate wait time and then waits the appropriate wait time. In some embodiments, the wait time depends on how many faces have been detected recently. In various embodiments, the wait time comprise one second, 10 seconds, one minute, one hour, or any other appropriate wait time.

In some embodiments, as faces are detected, face data are extracted and saved periodically while the vehicle is in operation. In some embodiments, the face images themselves are saved for quality control or any other purpose. Immediately after a face of sufficient quality (e.g., expected usefulness for establishing identity) has been detected, the event recorder pauses looking for new faces for a pre-determined amount of time that depends on how many faces have been seen recently. In some embodiments, different levels of quality are defined by the size of the detected face and the confidence of the face detection.

Figure 9:
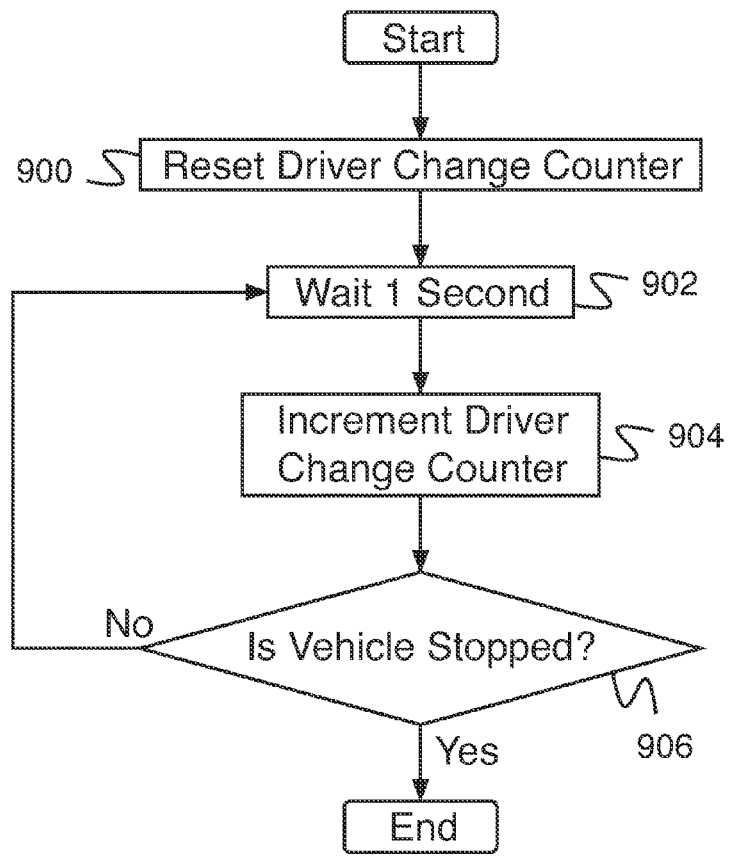
FIG. 9 is a flow diagram illustrating an embodiment of a process for a driver change counter.

FIG. 9 is a flow diagram illustrating an embodiment of a process for a driver change counter. In some embodiments, the process of FIG. 9 is executed by a vehicle event recorder (e.g., vehicle event recorder 102 of FIG. 1). In some embodiments, the process of FIG. 9 is used to determine an amount of time a vehicle is in continuous operation (e.g., during which the driver could not have changed). In the example shown, in 900, a driver change counter is reset (e.g., set to zero). In 902, the process waits one second. In 904, the driver change counter is incremented (e.g., such that the driver change counter represents a count of the number of seconds since it was reset). In 906, it is determined whether the vehicle is stopped. In various embodiments, determining whether the vehicle is stopped comprises determining whether the ignition is off, whether the vehicle is at zero speed, whether the vehicle is below a minimum speed, or whether the vehicle satisfies any other appropriate vehicle stopped criteria. In the event it is determined that the vehicle is not stopped, control passes to 902. In the event it is determined that the vehicle is stopped, the process ends.

In some embodiments, event recorders connect to vehicle data servers and upload passive driver identification data, comprising the face data for some or all of the detected faces, optionally the images of some or all of the detected faces, and the associated metadata, such as the event recorder's unique identifier, the precise time t of the detection, and associated self-assessed confidence values. When event recorders have GPS capabilities, they can associate with each face the number of seconds that had elapsed until time t during which the vehicle had been in continuous motion. This is called the "driver change counter." In some embodiments, the motion of the vehicle is inferred from a non-GPS sensor such as from the vehicle engine control unit (ECU).

Figure 10:
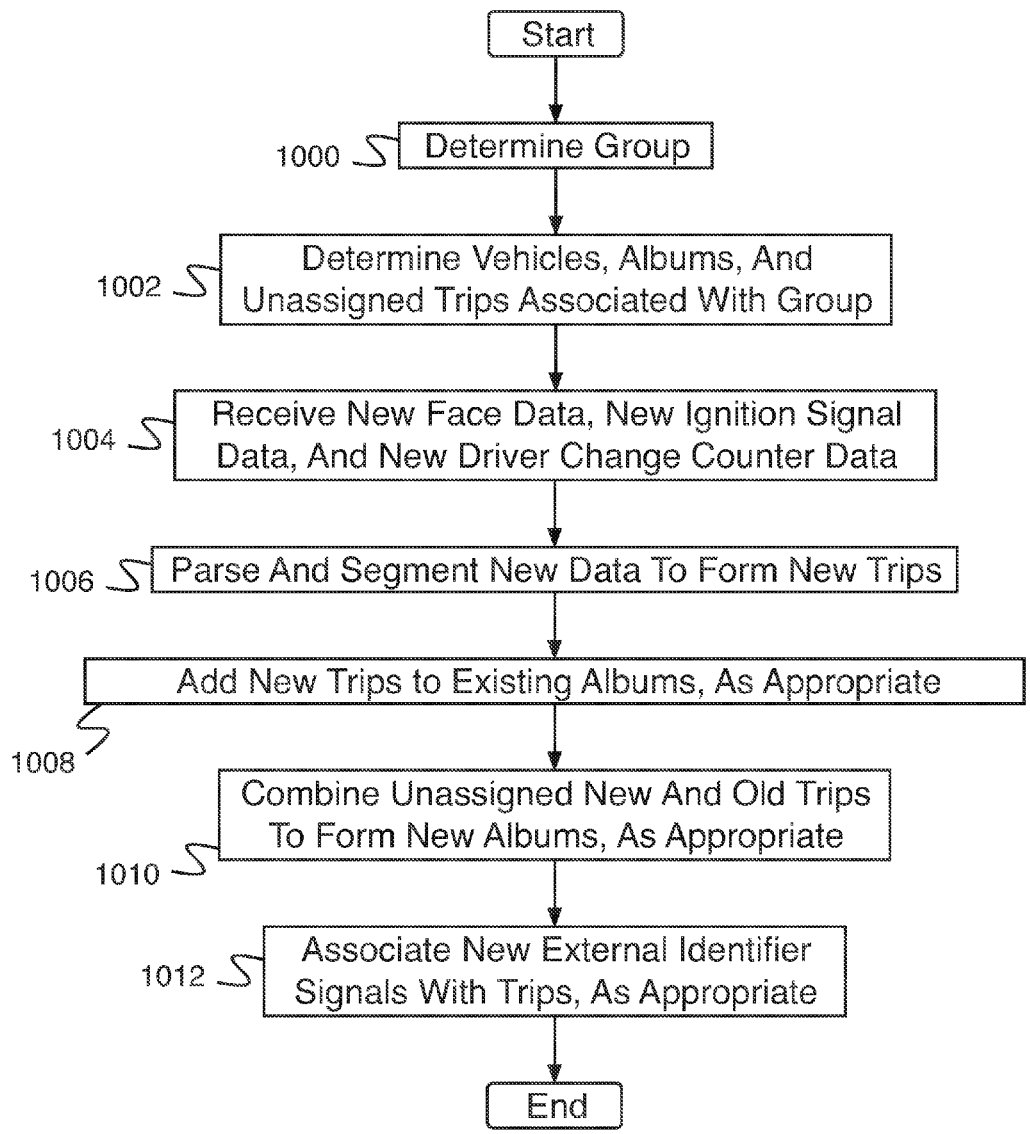
FIG. 10 is a flow diagram illustrating an embodiment of a process for album maintenance.

FIG. 10 is a flow diagram illustrating an embodiment of a process for album maintenance. In some embodiments, the process of FIG. 10 is executed by a vehicle data server (e.g., vehicle data server 104 of FIG. 1). In the example shown, in 1000, a group is determined. In some embodiments, a group comprises a set of vehicles and associated drivers—for example, a company (e.g., a trucking company, a limousine company, etc.) or geographically defined subdivision of a company. In 1002, vehicles, albums, and unassigned trips associated with the group are determined. In some embodiments, vehicles comprise vehicle identifier information. In some embodiments, unassigned trips comprise trips not associated with an album—for example, trips not part of an album and/or not identified by an album. In some embodiments, unassigned trips comprise trips more recent than a threshold date. In 1004, new face data, new ignition signal data and new driver change counter data are received. In some embodiments, new face data, new ignition signal data and new driver change counter data are received from a queue of data received from vehicle event recorders. In 1006, the new data is parsed and segmented to form new trips. In some embodiments, the data is parsed and segmented to form new trips comprising one driver for the entirety of each new trip. In 1008, the new trips are added to existing albums, as appropriate. In some embodiments, new trips are added to albums comprising trips associated with the same driver as the new trip. In some embodiments, if there is not an album comprising trips associated with the same driver as the new trip, the new trip is not added to an album. In 1010, unassigned new and old trips are combined to form new albums, as appropriate. In some embodiments, unassigned new and old trips are combined to form new albums if the unassigned new and old trips all are associated with the same driver and the unassigned new and old trips form more than a threshold number of trips. In some embodiments, establishing that the unassigned new and old trips are associated with the same driver comprises ensuring that they have high mutual similarity (e.g., by comparing face data between all pairs of trips). In 1012, new external identifier signals are associated with trips, as appropriate. In some embodiments, new external identifier signals are associated with trips using the process of FIG. 6.

Figure 11:
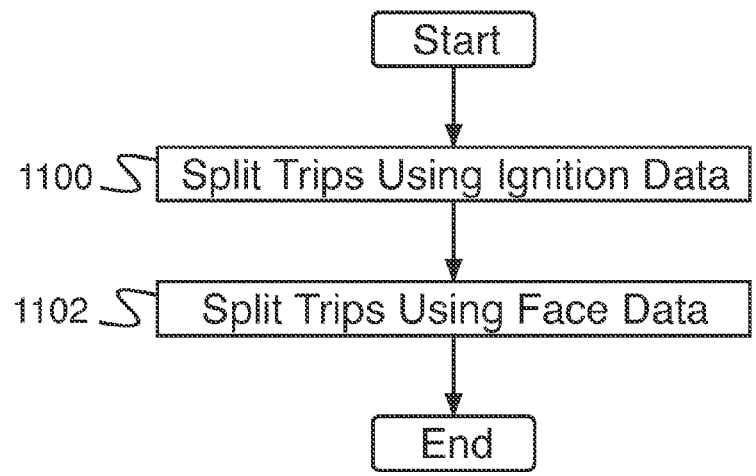
FIG. 11 is a flow diagram illustrating an embodiment of a process for parsing and segmenting data to form new trips.

FIG. 11 is a flow diagram illustrating an embodiment of a process for parsing and segmenting data to form new trips. In some embodiments, the process of FIG. 11 implements 1006 of FIG. 10. In the example shown, in 1100, trips are split using ignition data. In some embodiments, splitting trips comprises delineating trips using ignition data. For example, trips are defined as the interval between the moment when the vehicle ignition is turned on and the moment when the vehicle ignition is shut off. In various embodiments, a trip is split (e.g., a start and stop time for the trip) is determined based at least in part on vehicle speed or engine RPM (e.g., the speed is below a threshold, RPM's are below a threshold). In 1102, trips are split using face data. In some embodiments, trips are split using face data to split trips at a point where the face data indicate a high probability that the driver changes.

In some embodiments, the goal of the process for parsing and segmenting data to form new trips is to transform new face data into "trips," each of which represents a contiguous time period of activity of a single driver in a vehicle. Trips have attributes such as a start time, stop time, vehicle/device ID, and "quality," which is a measure of how useful that trip is expected to be in the task of identifying drivers.

In some embodiments, the first step of processing new data for a given group and time period is to retrieve all the relevant data for that group and time period. This includes the ignition-sense signals (ignition on/off) and all the face data. These signals are sorted chronologically for each vehicle in the group. Time periods between an "ignition-on" signal and an "ignition-off" signal are used to define new trips if the duration is lower than a maximum. Ambiguities in the sequence of ignition signals are resolved by selecting the maximum length trip consistent with at least two signals. For example, if the time-ordered sequence of signals is

<1: ON> <2: OFF> <3: ON> <4: ON> <5: OFF>, then two trips would be identified: the first spanning signals 1 and 2 and the second spanning signals 3 and 5. At this point the raw trips have been defined, and faces (face data) are assigned to a trip if their capture times are between the start and stop times of that trip (and they were in the same vehicle as that trip). If a vehicle has a face captured at a time that is not between the endpoints of any of its trips, that face is discarded.

In some embodiments, the segmentation process ensures that each trip contains only faces from one driver. This is accomplished by comparing all of the faces within a trip to each other, and establishing when driver changes might have occurred. First, if N is the number of faces in the trip, create an N by N matrix F whose (i, j) entry measures the similarity between face i and face j, where i and j are between 1 and N. In some embodiments, "similarity" comprises any function monotonically related to the probability that faces i and j are the same person. The "face utility" value can now be calculated and stored: face i has utility $\max_{j \neq i} F(i,j)$, that is the maximum similarity between face i and all other faces in the trip. With this matrix, a graph is created in which the vertices are the faces, and edge (i, j) is assigned weight F(i,j). If the Driver Change Counter value is set for one or more of those faces, it can be valuable in finding sets of faces that must have come from the same driver (e.g., because the vehicle would have been in continuous motion while those faces were captured). Those sets are well-defined and mutually exclusive. This constraint is encoded into the graph by adding an edge between any two faces in the same set with a weight set to its maximum. This graph is thresholded (e.g., edges with weight below the threshold are deleted) and separated into its connected components, some of which may be considered good candidates for being distinct people if additional criteria are satisfied. In some embodiments, the only criterion is that connected components have some minimum number of vertices (faces). Satisfying components are labeled "significant." The other components of the face similarity graph are labeled insignificant. If the trip only contains one such significant component, the trip is not segmented at all or remains whole. If the trip contains more than one significant component, it will be split into more than one trip, each of which will contain faces from one driver.

Figure 12:
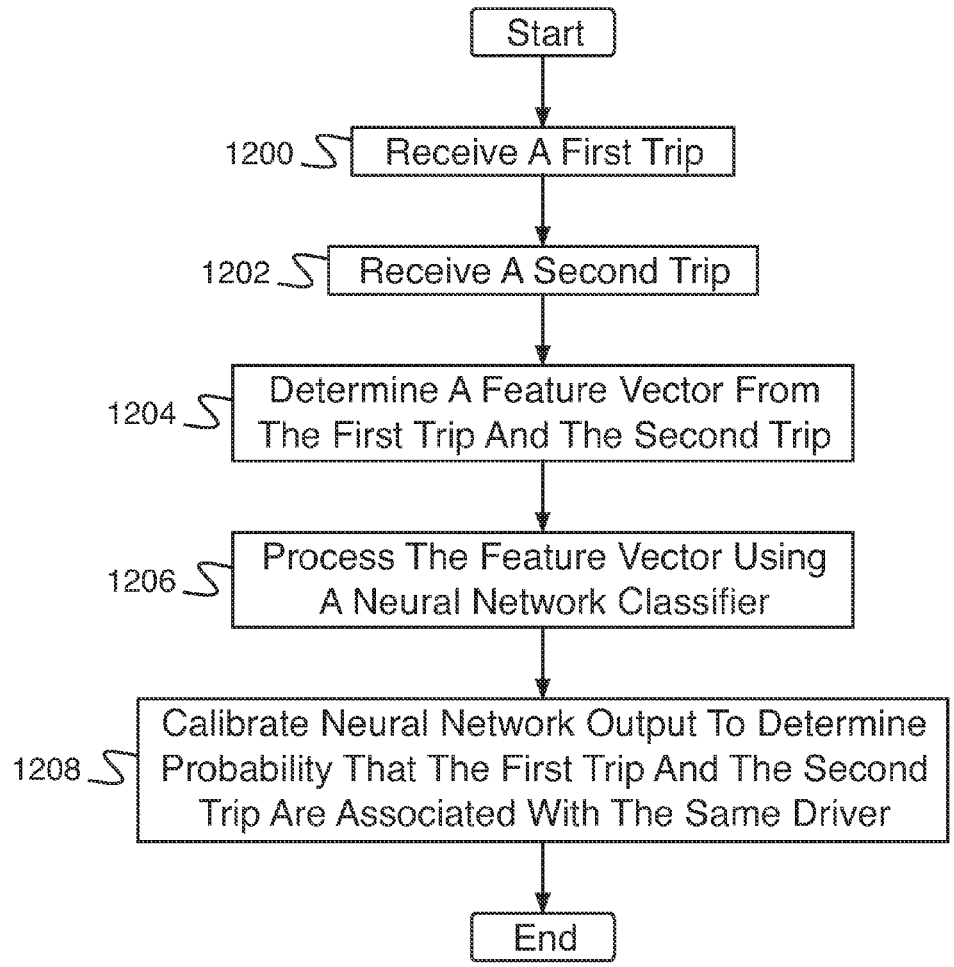
FIG. 12 is a flow diagram illustrating an embodiment of a process for determining a probability that two trips are associated with the same driver.

FIG. 12 is a flow diagram illustrating an embodiment of a process for determining a probability that two trips are associated with the same driver. In some embodiments, determining a probability that two trips are associated with the same driver comprises part of associating new trips with existing albums (e.g., associating new trips with existing albums, as appropriate, 1010 of FIG. 10). In some embodiments, determining a probability that two trips are associated with the same driver comprises part of combining unassigned new and old trips to form new albums (e.g., combining unassigned new and old trips to form new albums, as appropriate, 1012 of FIG. 10). In 1200, a first trip is received. In 1202, a second trip is received. In 1204, a feature vector is determined from the first trip and the second trip. In 1206, the feature vector is processed using a neural network classifier. In 1208, the neural network output is calibrated to determine the probability that the first trip and the second trip are associated with the same driver. In various embodiments, calibrating the neural network output comprises adding a scaling factor to the probability, multiplying the probability by a scaling factor, applying a nonlinear function to the probability, or calibrating the probability in any other appropriate way. In some embodiments, a numeric score that is not a strict probability but still indicates a degree of similarity between the drivers in the two trips is used.

In some embodiments, trips are the "atoms" of identification in passive driver identification; albums are defined as sets of trips, and drivers are identified by comparing trips to albums. This requires a consistent way to rate the probability that the driver of two trips is the same person. This is not a straightforward machine learning problem because trips can contain different numbers of faces.

In some embodiments, a constant-length feature vector is created from two trips and used as input to a binary classifier (e.g. support vector machine (SVM), decision tree, logistic regression, feed-forward artificial neural network). In some embodiments, a neural network classifier is trained to distinguish a pair of trips with the same driver from a pair of trips with two different drivers. The feature vector for two trips A and B is derived from statistics of the "similarity matrix" S, where entry S(i,j) is the similarity of face i in trip A and face j in trip B. These statistics include histogram-like bin counts, and quantile values. The output of this classifier is then calibrated to output accurate probability estimates. The calibrated output is the estimated probability that the two trips contain the same driver.

Figure 13:
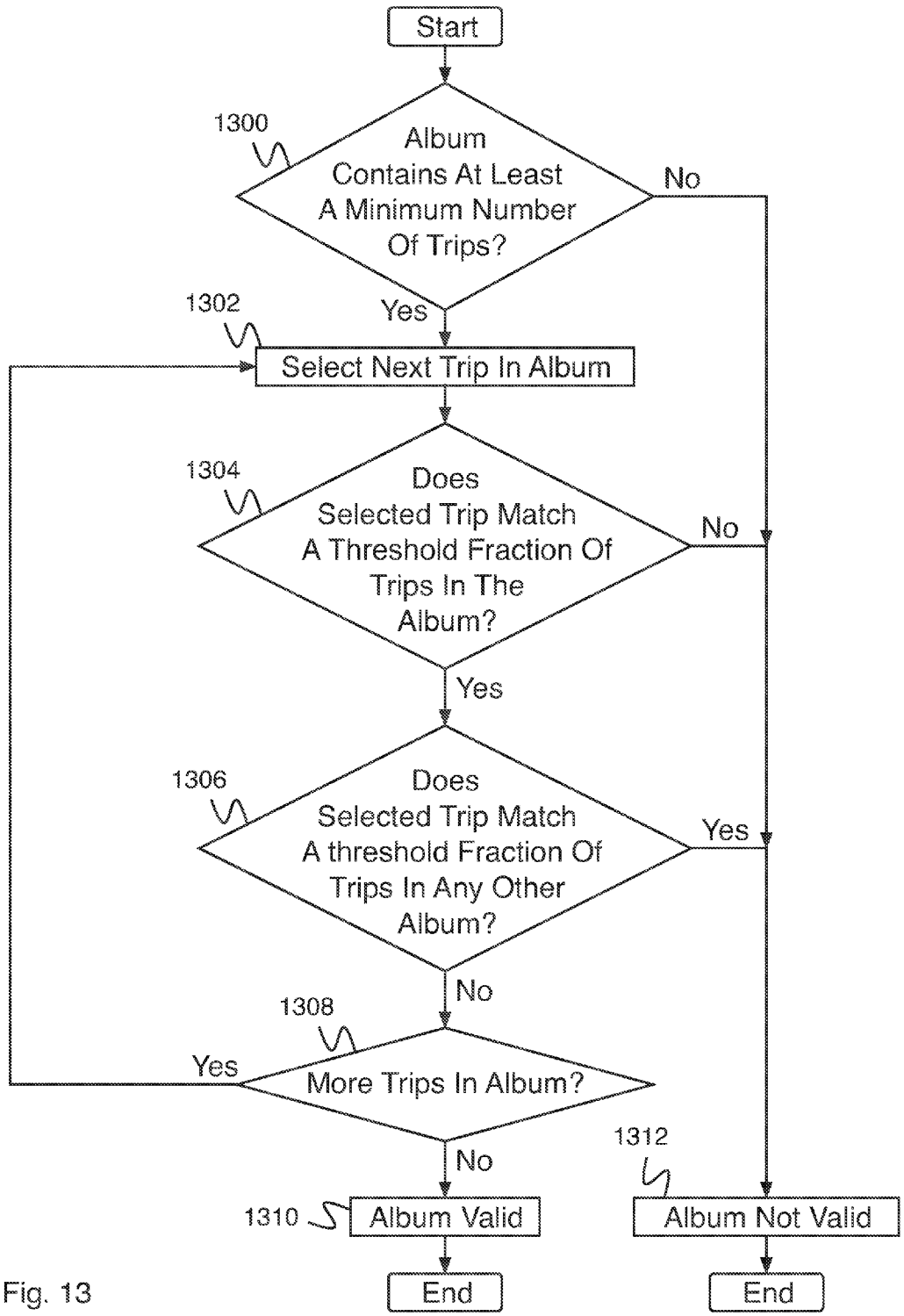
FIG. 13 is a flow diagram illustrating an embodiment of a process for determining validity of an album.

FIG. 13 is a flow diagram illustrating an embodiment of a process for determining validity of an album. In some embodiments, the process for determining validity of an album comprises determining that consistency constraints are satisfied. In some embodiments, the process of FIG. 13 is executed by a vehicle data server (e.g., vehicle data server 104 of FIG. 1). In the example shown, in 1300, it is determined whether the album contains at least a minimum number of trips. If it is determined that that album does not contain a minimum number of trips, control passes to 1312. In 1312, it is reported that the album is not valid, and the process ends. If it is determined in 1300 that the album contains at least a minimum number of trips, control passes to 1302. In 1302, the next trip in the album is selected. In some embodiments, the next trip comprises the first trip. In 1304 it is determined whether the selected trip matches a threshold fraction of trips in the album (e.g., whether the selected trip is associated with the same driver as at least a threshold fraction of trips in the album). In some embodiments, the threshold fraction is predetermined or determined dynamically. In some embodiments, it is determined whether two trips match by using the process of FIG. 12 to determine a probability that the trips are associated with the same driver and comparing the probability with a threshold probability. If it is determined in 1304 that the selected trip does not match a threshold fraction of trips in the album, control passes to 1312. If it is determined in 1304 that the selected trip does match a threshold fraction of trips in the album, control passes to 1306. In 1306, it is determined whether the selected trip matches a threshold fraction of trips in any other album. If it is determined that the selected trip matches a threshold fraction of trips in any other album, control passes to 1312. If it is determined in 1306 that the selected trip does not match a threshold fraction of trips in any other album, control passes to 1308. In 1308, it is determined whether there are more trips in the album. If there are more trips in the album, control passes to 1302. If there are not more trips in the album, control passes to 1310. In 1310, it is reported that the album is valid. In some embodiments, the process for determining the validity of the albums is not performed by a separate procedure but the satisfaction of album validity requirements is ensured in other processes modifying albums such as album maintenance FIG. 10.

In some embodiments, the current set of albums should be mutually consistent with each other. This is ensured by determining if a proposed change to the album(s) would violate one of the following constraints:

Minimum in-links requirement (e.g., a fraction less than 1): a trip T in an album A must match at least this fraction of the other trips in that album;

Maximum out-links requirement (e.g., a fraction less than 1): a trip T's matches to trips in other albums must be at most this fraction of a T's total matches (e.g., when including T's matches to trips in its own album). (Note: in some embodiments, this is normalized to be insensitive to the number of other albums, for example, by changing it to "T must match no more than 4% of the trips in any one given album T of which T is not a member," e.g., a per-album requirement);

Each album must be at least a minimum size.

In some embodiments, a "match" means the probability output of the trip-to-trip comparison function is greater than or equal to some constant threshold. Changes to albums such as the addition of a trip to an existing album and the addition of a new album are only made if they do not cause the consistency requirements to fail.

Figure 14:
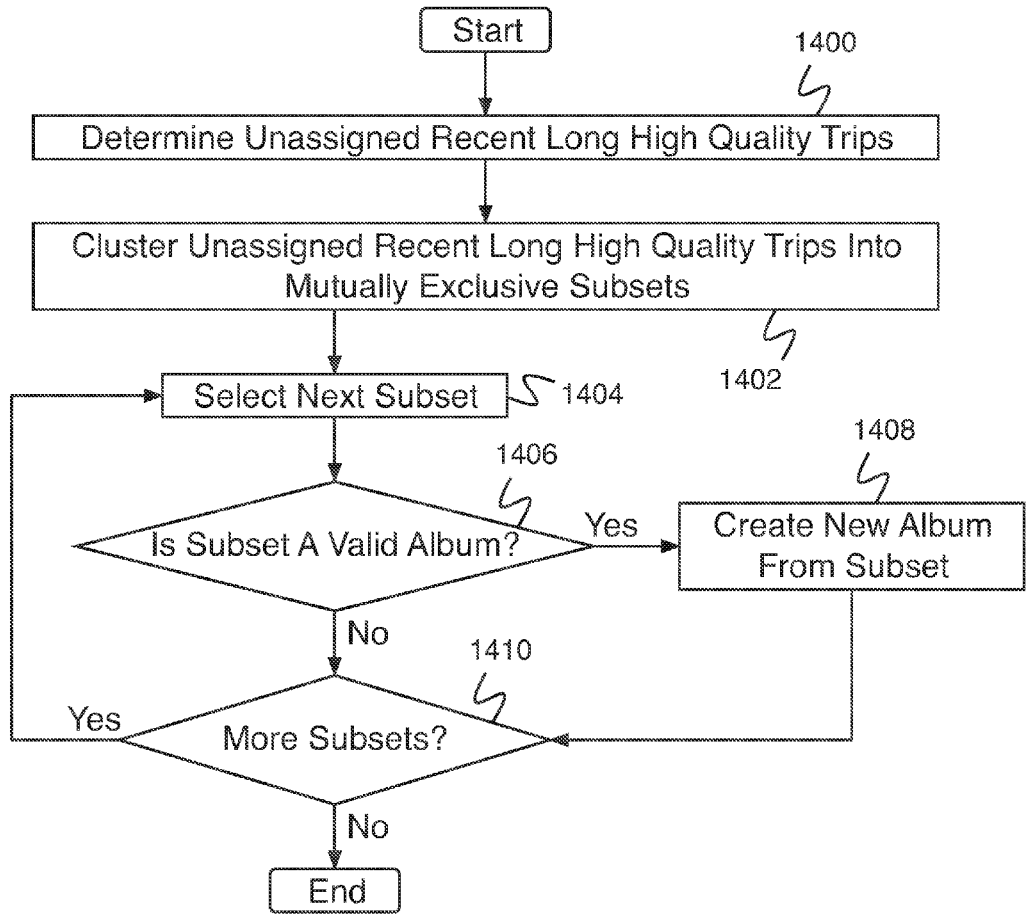
FIG. 14 is a flow diagram illustrating an embodiment of a process for forming new albums.

FIG. 14 is a flow diagram illustrating an embodiment of a process for forming new albums. In some embodiments, the process of FIG. 14 implements 1010 of FIG. 10. In the example shown, in 1400, unassigned recent long high quality trips are determined. In some embodiments, unassigned trips comprise trips that are not already assigned to an album. In some embodiments, recent trips comprise trips that are more recent than a threshold date. In some embodiments, long trips comprise trips comprising more than a threshold number of face images or associated face data. In some embodiments, a high quality trip comprises a trip wherein the faces have greater than a threshold degree of similarity. In 1402, the unassigned recent long high quality trips are clustered into mutually exclusive subsets. In some embodiments, mutually exclusive subsets comprise subsets of the set of unassigned recent long high quality trips comprising mutually exclusive face data (e.g., the same driver is not represented in multiple mutually exclusive subsets). In 1404, the next subset is selected. For example, the next mutually exclusive subset of the unassigned recent long high quality trips. In some embodiments, the next subset comprises the first subset. In 1406, it is determined whether the subset is a valid album. In some embodiments, it is determined whether the subset is a valid album using the process of FIG. 13. If it is determined that the subset is a valid album, control passes to 1408. In 1408, a new album is created from the subset. For example, a new album is created comprising the trips forming the subset. Control then passes to 1410. In the event it is determined in 1406 that the subset is not a valid album, control passes to 1410. In 1410, it is determined whether there are more subsets. In the event there are more subsets, control passes to 1404. In the event it is determined that there are not more subsets, the process ends.

In some embodiments, the set of high quality (HQ) trips that do not belong to any album and are not identified by any of the existing albums is examined to form new albums for the group. Only the "long" HQ trips are used, where long indicates some minimum duration and/or a minimum number of captured faces. In some embodiments, only a set of the most recent long HQ trips per vehicle is considered to reduce the amount of computation required.

In some embodiments, the set of group's long HQ trips is clustered or partitioned into mutually exclusive or nearly mutually exclusive subsets such that within each subset all of the trips match each other with high probability (e.g., above a predetermined threshold value) and trips in different subsets do not match each other or have a match probability that is low (e.g., below a predetermined threshold). These subsets are candidate new albums, and if any subset satisfies the album consistency requirements (and do not cause any existing album to cease satisfying them) it is added as a new album. Some clustering algorithms have superlinear computational complexity in the number of items being clustered and this step can be computationally prohibitive. One solution is to cluster the set of trips in batches, where each batch is populated by a distinct set of vehicles in the group. This takes advantage of the fact that the distribution of drivers in trips is not completely random; several trips in the same vehicle will probably be with the same driver. The candidate albums found by clustering each batch can be combined into a single set of candidates, which is then evaluated as if they had been found by clustering all the candidates at once. In some embodiments, the clustering algorithm uses as its only input a self-similarity matrix S. If the set of candidate long HQ trips contains C trips (or, equivalently, if the subset of candidates forming a single batch contains C trips), a C by C symmetric similarity matrix S is defined, where each (i,j) entry is the probability that trips i and j have the same driver. This set could be clustered by any similarity and/or distance based clustering algorithm. In some embodiments, the algorithm comprises "spectral clustering."

Figure 15:
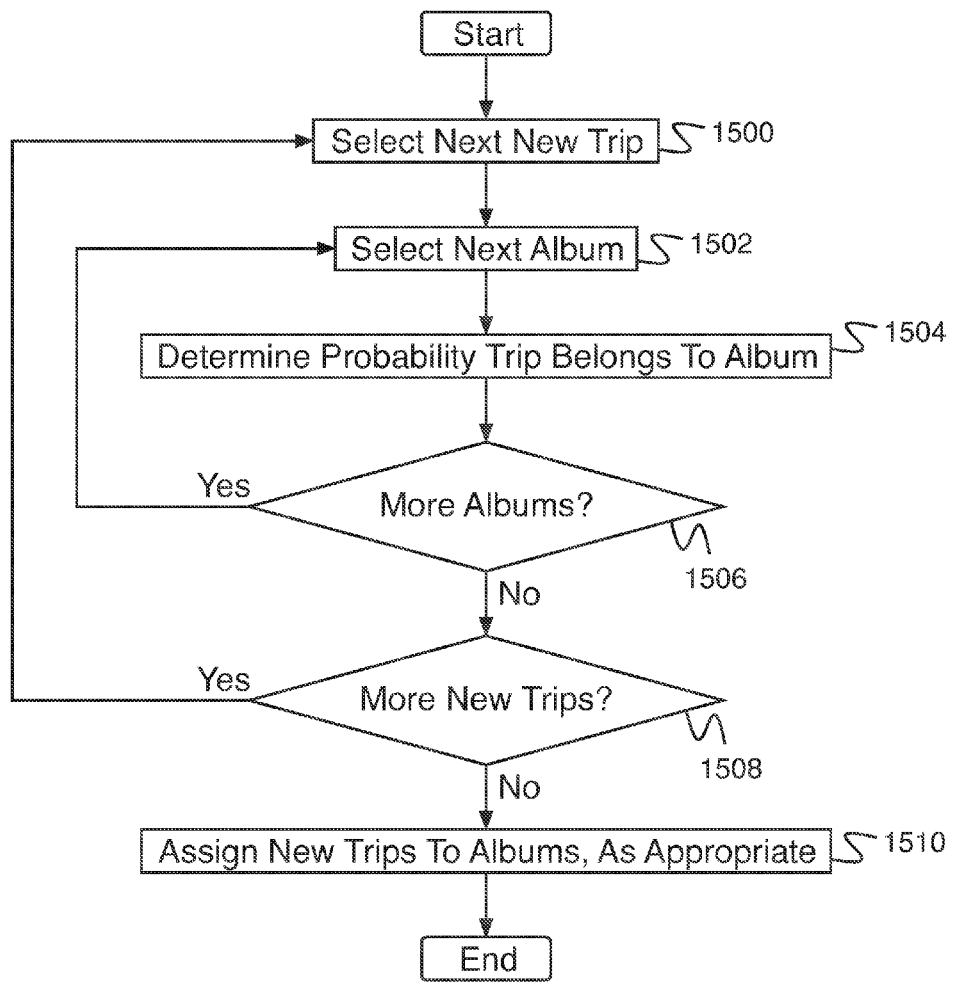
FIG. 15 is a flow diagram illustrating an embodiment of a process for associating new trips with albums.

FIG. 15 is a flow diagram illustrating an embodiment of a process for associating new trips with albums. In some embodiments, the process of FIG. 15 implements 1008 of FIG. 10. In the example shown, in 1500, the next new trip is selected. In some embodiments, the next new trip comprises the first new trip. In 1502, the next album is selected. In some embodiments, the next album comprises the first album. In 1504, the probability that the trip belongs to the album is determined. In 1506 it is determined whether there are more albums. If it is determined that there are more albums, control passes to 1502. If it is determined that there are not more albums, control passes to 1508. In 1508, it is determined whether there are more new trips. If it is determined that there are more new trips, control passes to 1500. If it is determined that there are not more new trips, control passes to 1510. In 1510, the new trips are assigned to albums, as appropriate. In some embodiments, each trip is assigned to the album it has the highest probability of belonging to, as long as that probability is above a threshold.

Figure 16:
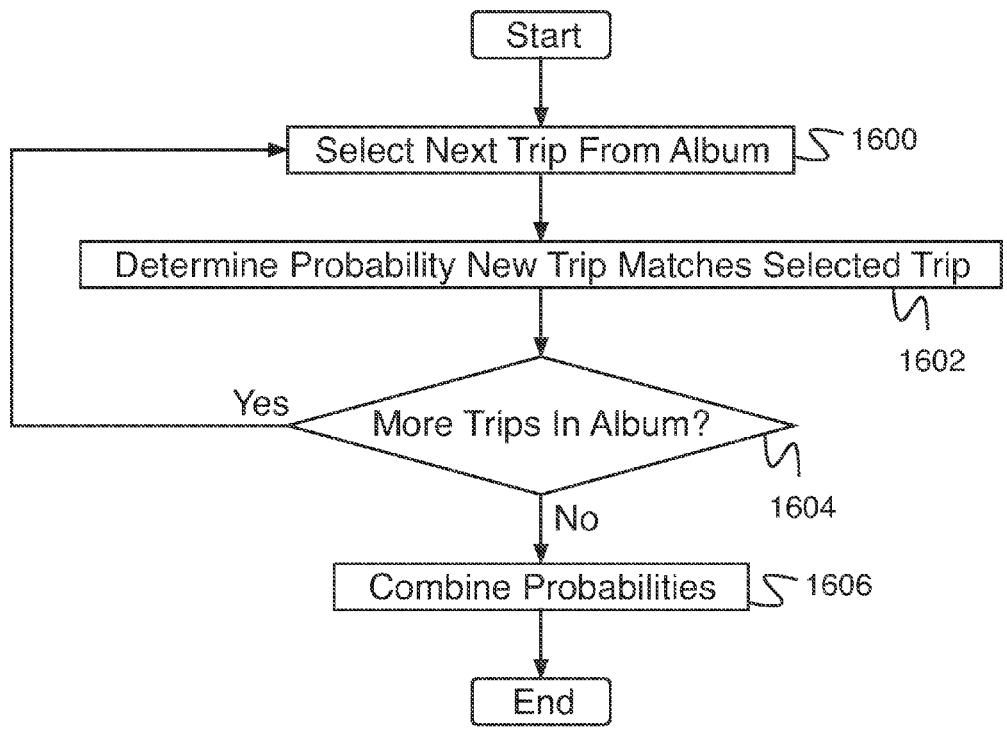
FIG. 16 is a flow diagram illustrating an embodiment of a process for determining a probability that a new trip has a driver that matches the driver of the trips in an album.

FIG. 16 is a flow diagram illustrating an embodiment of a process for determining a probability that a new trip has a driver that matches the driver of the trips in an album. In some embodiments, the process of FIG. 16 implements 1504 of FIG. 15. In 1600, the next trip is selected from the album. In some embodiments, the next trip comprises the first trip. In 1602, the probability that the new trip matches the selected trip is determined. In some embodiments, the probability that the new trip matches the selected trip is determined using the process of FIG. 12. In 1604, it is determined whether there are more trips in the album. In the event it is determined that there are more trips in the album, control passes to 1600. In the event it is determined that there are not more trips in the album, control passes to 1606. In some embodiments, not all trips are selected from the album in order to reduce processor load. In 1606, the probabilities are combined. For example, the probabilities are combined to determine the probability that the new trip belongs to the album. In various embodiments, the probabilities are combined by calculating the maximum, the minimum, the median, the arithmetic mean, or by any other appropriate method. In some embodiments, the likelihood that the new trip belongs to the album is calculated through a statistical hypothesis test of the probabilities.

In some embodiments, to identify trip T means to find the set of probabilities that T's driver is the same person in each of the N albums $A_1, A_2, \ldots, A_N$ in a group. For example, first T is compared to trips in every album for that group. In some embodiments, a subset of trips in albums is used to lighten the computational load. These comparisons produce a set of probabilities for each album, estimating the likelihood that the driver in trip T matches each of that album's trips or a subset of albums, if not all trips are used. The set of these probabilities P, for one album $A_i$ is combined into a single probability—the probability that the driver is the person represented by that album. There are many possible ways to combine the probabilities, such as using the minimum, maximum, median, or arithmetic mean. Another approach is to compare the distribution of probabilities in P, to the expected distribution under the hypothesis that the two drivers are the same person. In some embodiments, this hypothesis is tested by assuming a binomial distribution $B_H$ of positive matches between T and the album's trips (e.g., the left-tail cumulative distribution), where the probability of a single success is a fixed constant H that is optimized through experimental trial and error or by any other appropriate optimization technique. The likelihood that the probabilities in P, are drawn from $B_H$ is interpreted as the probability that the driver in trip T is the person in album A. Applying this hypothesis test to every album in the group results in a vector V of N probabilities that T has the driver in each of the N albums. In some embodiments, V is converted from a vector of binary probabilities to a vector of multiclass probabilities by dividing each probability in V by the sum of all of the probabilities in V. In some embodiments, estimates of the likelihood of a driver match are made more conservative by skipping this conversion step whenever the sum of probabilities in V is less than 1. This conservative approach ensures that when the trip T has a driver with no representation in any of the albums, probabilities are not increased by the conversion step, and when the trip T highly matches multiple albums, the probabilities are adjusted downwards to account for the uncertainty. In some embodiments, trip T is assigned to an album when the corresponding multiclass probability is above a minimum threshold. This assignment also records the probability which can be interpreted as the confidence of the assignment. Multiple partial assignments are possible and may be desirable (e.g. 60% Alice, 30% Bob).

Figure 17:
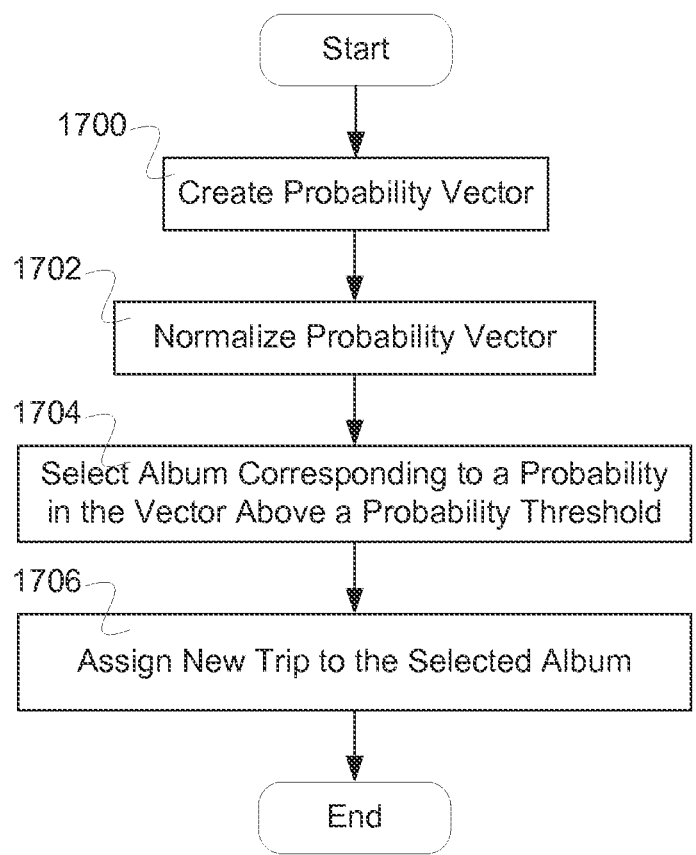
FIG. 17 is a flow diagram illustrating an embodiment of a process for assigning new trips to albums.

FIG. 17 is a flow diagram illustrating an embodiment of a process for assigning new trips to albums. In some embodiments, the process of FIG. 17 implements 1510 of FIG. 15. In the example shown, in 1700, a probability vector is created. For example, the probability vector is created by taking a set of probabilities determined by comparing a new trip to each album in a set of albums (e.g., using the process illustrated in FIG. 16) and assembling the set of probabilities into a vector. In 1702, the probability vector is normalized. For example, the probability vector is normalized by dividing each component of the vector by the sum of the vector's components. In some embodiments, the probability vector is normalized by dividing each component of the vector by the sum of components only if the sum is greater than one. In 1704, the album corresponding to a probability in the vector above a probability threshold is selected. In some embodiments, in the event more than one probability is above the probability threshold, all albums with probabilities above the probability threshold are selected. In 1706, the new trip is assigned to the selected album. In the event more than one album is selected, the new trip is assigned to each selected album and each assignment records its corresponding probability.

Figure 18:
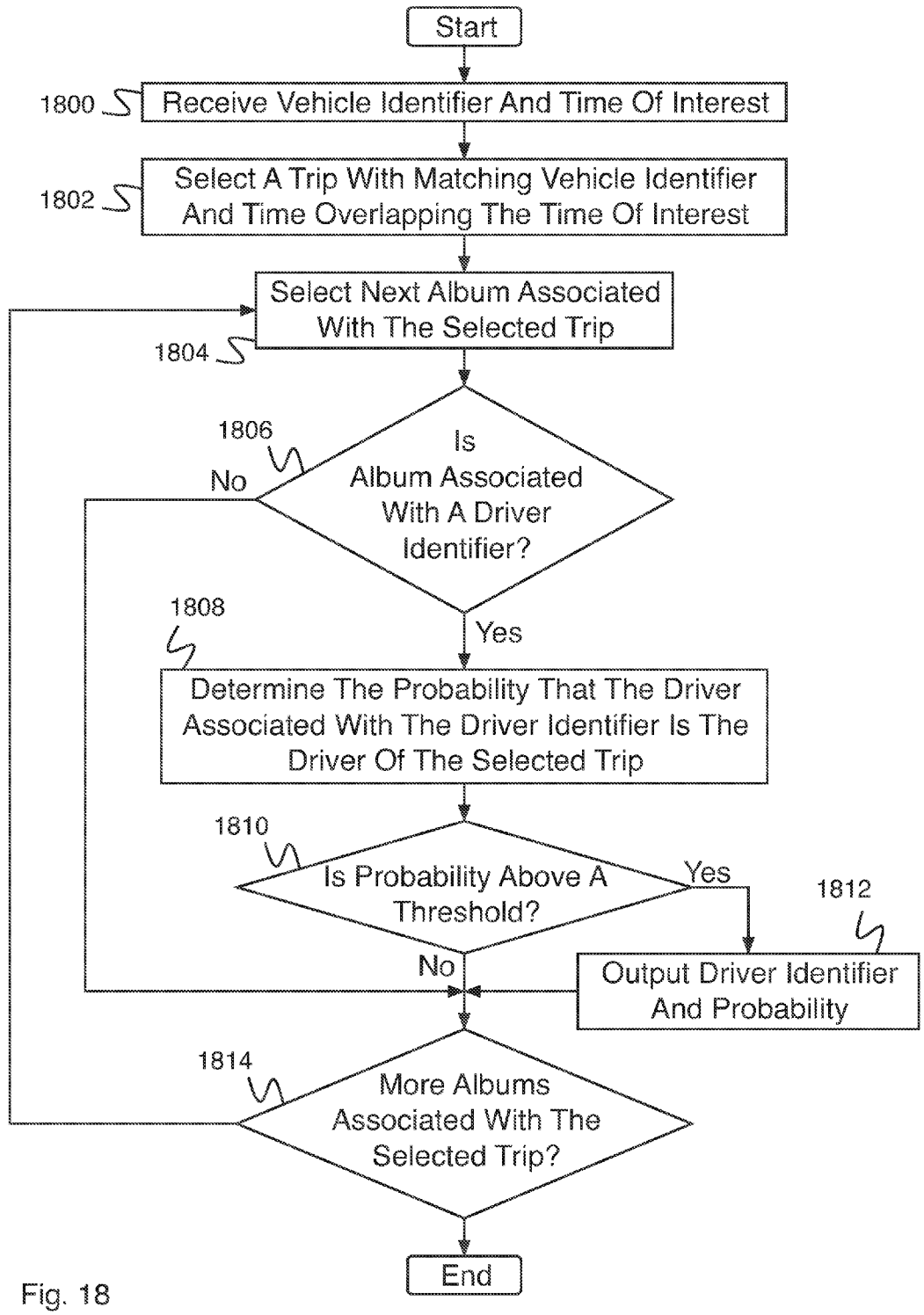
FIG. 18 is a flow diagram illustrating an embodiment of a process for processing a query to a driver identifier system.

FIG. 18 is a flow diagram illustrating an embodiment of a process for processing a query to a driver identifier system. In some embodiments, the process of FIG. 18 is executed by a vehicle data server (e.g., vehicle data server 104 of FIG. 1). In the example shown, in 1800, a vehicle identifier and a time of interest are received. In some embodiments, a vehicle data server user interacting with the vehicle data server desires to know the name of the driver associated with a vehicle identifier at the time of interest. In 1802, a trip associated with a vehicle identifier matching the received vehicle identifier and a time overlapping the received time of interest is selected. For example, the time is within the times associated with a trip. In some embodiments, a neighboring trip just before or just after are also provided to account for inaccuracies in times associated with the trips or in the determination of an time of interest. In 1804, the next album associated with the selected trip is selected. In some embodiments, the first album associated with the selected trip is selected. In some embodiments, the trip is associated with only one album. In some embodiments, in the event the trip is associated with no albums, the process ends. In 1806, it is determined whether the album is associated with a driver identifier. In the event the album is not associated with a driver identifier, control passes to 1814. In the event the album is associated with a driver identifier, control passes to 1808. In 1808, the probability that the driver associated with the driver identifier associated with the album is the driver of the selected trip is determined. In 1810, it is determined whether the probability is above a threshold. For example, the probability is determined and then compared to a predetermined threshold. If it is determined that the probability is not above a threshold, control passes to 1814. If it is determined that the probability is above a threshold, control passes to 1812. In 1812, the driver identifier and the probability are output. For example, the driver identifier and the probability are provided to the vehicle data server user interacting with the vehicle data server. Control then passes to 1814. In 1814, it is determined whether there are more albums associated with the selected trip. In the event that there are more albums associated with the selected trip, control passes to 1804. In the event that there are not more albums associated with the selected trip, the process ends.

Figure 19:
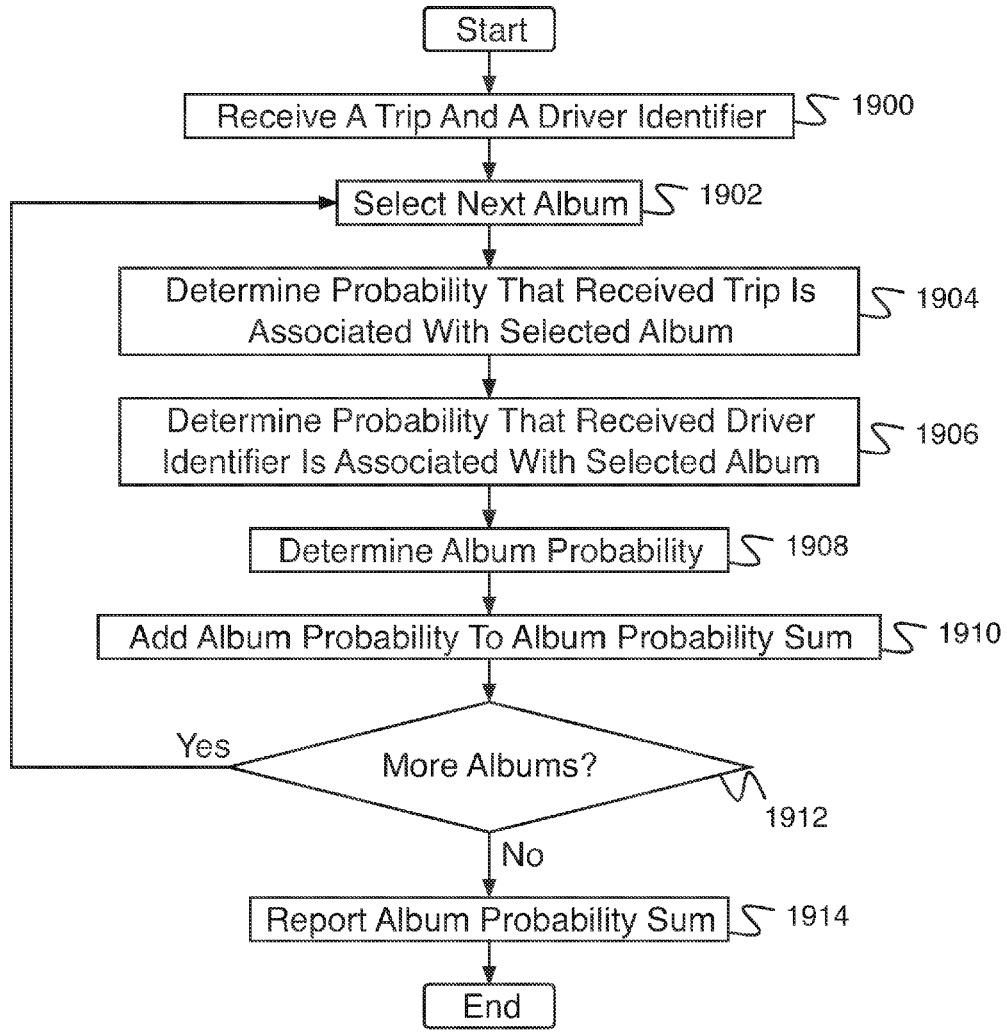
FIG. 19 is a flow diagram illustrating an embodiment of a process for determining the probability that a driver associated with a driver identifier is the driver of a selected trip.

FIG. 19 is a flow diagram illustrating an embodiment of a process for determining the probability that a driver associated with a driver identifier is the driver of a selected trip. In some embodiments, the process of FIG. 19 implements 1808 of FIG. 18. In the example shown, in 1900, a driver identifier and a trip are received. In 1902, the next album is selected. In some embodiments, the next album comprises the first album. In 1904, the probability that the received trip is associated with the selected album is determined. In 1906, the probability that the received driver identifier is associated with the selected album is determined. In 1908, the album probability is determined. In some embodiments, the album probability is determined by multiplying the probability that the received trip is associated with the selected album by the probability that the received driver identifier is associated with the selected album. In 1910, the album probability is added to an album probability sum. In some embodiments, the album probability sum is set to zero when the process starts. In 1912, it is determined whether there are more albums. In the event it is determined that there are more albums, control passes to 1902. In the event it is determined that there are not more albums, control passes to 1914. In 1914, the album probability sum is reported.

In some embodiments, to estimate the final probability that trip T was driven by driver D, the probability that trip T is identified to album A is combined with the probability that album A is an album comprising trips in which driver D was the driver. In some embodiments, because each album is potentially associated with more than one external driver ID signal, the probability that album A is an album containing driver D is the proportion of external driver ID signals indicating driver D; i.e., the proportion is the ratio of the number of ID signals for driver D to the total number of ID signals for that album. These proportions may be adjusted depending on their ID-album association types—for example, older signals (e.g., type 2) might be discounted relative to newer signals (e.g., type 1). The probability that a given trip T was driven by a particular driver D is then estimated as the sum over all albums of the probability of T belonging to each album times the probability of that album containing driver D. In some embodiments, this probability is calibrated.

Figure 20:
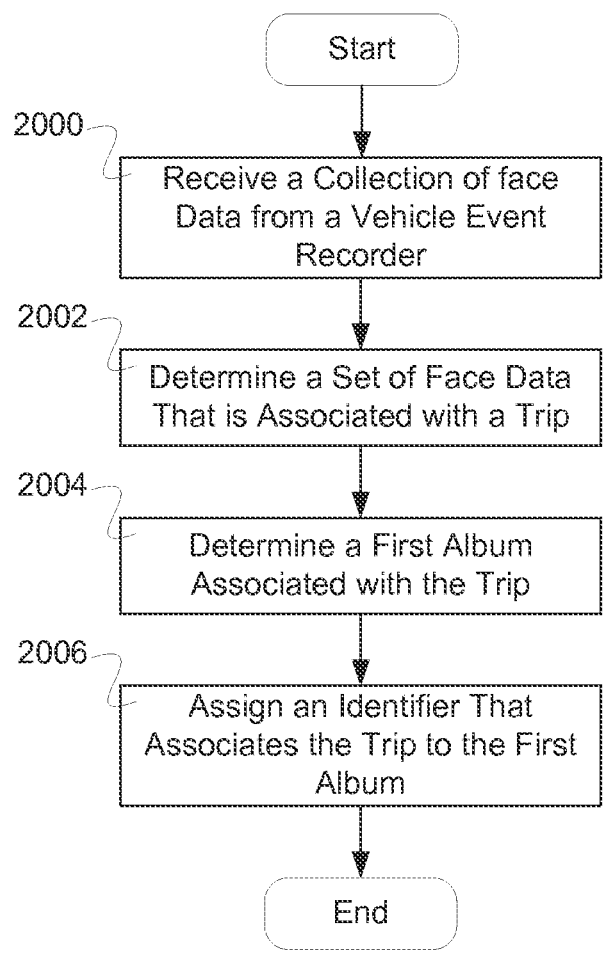
FIG. 20 is a flow diagram illustrating an embodiment of a process for passive driver identification.

FIG. 20 is a flow diagram illustrating an embodiment of a process for passive driver identification. In some embodiments, the process of FIG. 20 is performed by a vehicle data server (e.g., vehicle data server 104 of FIG. 1). In the example shown, in 2000, a collection of face data is received from a vehicle event recorder. In 2002, a set of face data that is associated with a trip is determined. In 2004, a first album associated with the trip is determined. In some embodiments, the face data of the trip is similar to face data of other trips in the first album. In some embodiments, the face data of the trip is dissimilar to face data of a set of trips in a second album. In 2006, an identifier is assigned that associates the trip to the first album.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for passive driver identification, comprising:
an input interface configured to:
receive a collection of face data from a vehicle event recorder; and
a processor configured to:
determine a set of face data of the collection of face data that is associated with a trip;
determine a first album associated with the trip;
wherein the set of face data associated with the trip is similar to face data of other trips in the first album; and wherein the set of face data associated with the trip is dissimilar to face data of a set of trips in a second album; and assign an identifier that associates the trip to the first album.

2. A system as in claim 1, wherein the input interface is further configured to receive is images.

3. A system as in claim 1, wherein the input interface is further configured to receive time information.

4. A system as in claim 1, wherein the input interface is further configured to receive vehicle identifier information.

5. A system as in claim 1, wherein the input interface is further configured to receive location information.

6. A system as in claim 1, wherein the input interface is further configured to receive ignition information.

7. A system as in claim 6, wherein the ignition information is used to determine a start time and a stop time for a trip.

8. A system as in claim 1, wherein a face data of the collection of face data comprises a set of numeric quantities calculated from a face image that is used to compare face images.

9. A system as in claim 1, wherein a probability is estimated that a first person in a first image is the same as a second person in a second image.

10. A system as in claim 1, wherein the processor is further configured to associate the identifier with a driver.

11. A system as in claim 1, wherein determining the first album associated with the trip comprises determining an existing album associated with the trip.

12. A system as in claim 11, wherein determining the existing album associated with the trip comprises determining a probability that the trip belongs to each existing album.

13. A system as in claim 1, wherein the identifier is assigned to the album based at least in part on a verified association database.

14. A computer program product for passive driver identification, the computer program product being embodied in a non-transitory computer readable storage medium and comprising computer instructions for:
receiving a collection of face data from a vehicle event recorder;
determining, using a processor, a set of face data of the collection of face data that is associated with a trip;
determining a first album associated with the trip;
wherein the set of face data associated with the trip is similar to face data of other trips in the first album; and
wherein the set of face data associated with the trip is dissimilar to face data of a set of trips in a second album; and
assigning an identifier that associates the trip to the first album.

15. A method for passive driver identification, comprising:
receiving a collection of face data from a vehicle event recorder;
determining, using a processor, a set of face data of the collection of face data that is associated with a trip;
determining a first album associated with the trip;
wherein the set of face data associated with the trip is similar to face data of other trips in the first album; and
wherein the set of face data associated with the trip is dissimilar to face data of a set of trips in a second album; and
assigning an identifier that associates the trip to the first album.

16. A system as in claim 14, wherein the verified association database stores a driver identifier associated with one or more of the following: a verified face data, a driver RFID, or a driver biometric.

* * * * *